US007571650B2

(12) United States Patent
McKinnell et al.

(10) Patent No.: US 7,571,650 B2
(45) Date of Patent: Aug. 11, 2009

(54) PIEZO RESISTIVE PRESSURE SENSOR

(75) Inventors: James C. McKinnell, Corvallis, OR (US); Eric L. Nikkel, Corvallis, OR (US); Jennifer L. Wu, Corvallis, OR (US); Adel B. Jilani, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/830,658

(22) Filed: Jul. 30, 2007

(65) Prior Publication Data

US 2009/0031818 A1 Feb. 5, 2009

(51) Int. Cl.
*G01L 9/06* (2006.01)

(52) U.S. Cl. ........................ 73/721; 73/715; 361/283.4

(58) Field of Classification Search ........... 73/700–756; 361/283.1–283.4

See application file for complete search history.

(56) References Cited

U.S. PATENT DOCUMENTS 3,716,681 A 2/1973 Barrow
4,182,937 A 1/1980 Greenwood
5,116,457 A 5/1992 Jerman
5,408,112 A 4/1995 Tai et al.
5,869,876 A 2/1999 Ishio et al.
6,028,389 A 2/2000 Bernstein
6,388,299 B1 * 5/2002 Kang et al. ................. 257/415
6,536,460 B1 3/2003 Velverton
6,557,413 B2 5/2003 Nieminen et al.
6,594,057 B1 7/2003 Drake et al.
6,619,133 B1 9/2003 Goshoo et al.
6,806,593 B2 * 10/2004 Tai et al. ..................... 307/400
6,928,878 B1 * 8/2005 Eriksen et al. ................ 73/724
7,023,066 B2 4/2006 Lee
7,104,130 B2 * 9/2006 Kenny et al. ............. 73/514.33
7,223,624 B2 * 5/2007 Wu et al. ...................... 438/52
2006/0093170 A1 5/2006 Zhe et al.

OTHER PUBLICATIONS

Arnold et al., A Piezoresistive Microphone for Aeroacoustic Measurements, Proceedings of 2001 ASME, pp. 1-8, New York, NY.
Sheplak et al., A MEMS Microphone for Aeroacoustics Measurements, American Institute of Aeronautics and Astronautics, 1999.

* cited by examiner

*Primary Examiner*—Andre J Allen
*Assistant Examiner*—Jermaine Jenkins

(57) ABSTRACT

Various embodiments and methods relating to a pressure sensor having a flexure supported piezo resistive sensing element are disclosed.

22 Claims, 5 Drawing Sheets

PIEZO RESISTIVE PRESSURE SENSOR

BACKGROUND

Pressure sensors are used to sense pressure fluctuations. Such pressure sensors may be complex and difficult to fabricate or may lack desired performance.

BRIEF DESCRIPTION OF THE DRAWINGS

FIGS. 2-5 are sectional views illustrating an example method for forming the pressure sensor of FIG. 5 according to an example embodiment.

FIGS. 8-13 are sectional views illustrating an example method for forming the pressure sensor of FIG. 13 according to an example embodiment.

DETAILED DESCRIPTION OF THE EXAMPLE EMBODIMENTS

Figure 1:
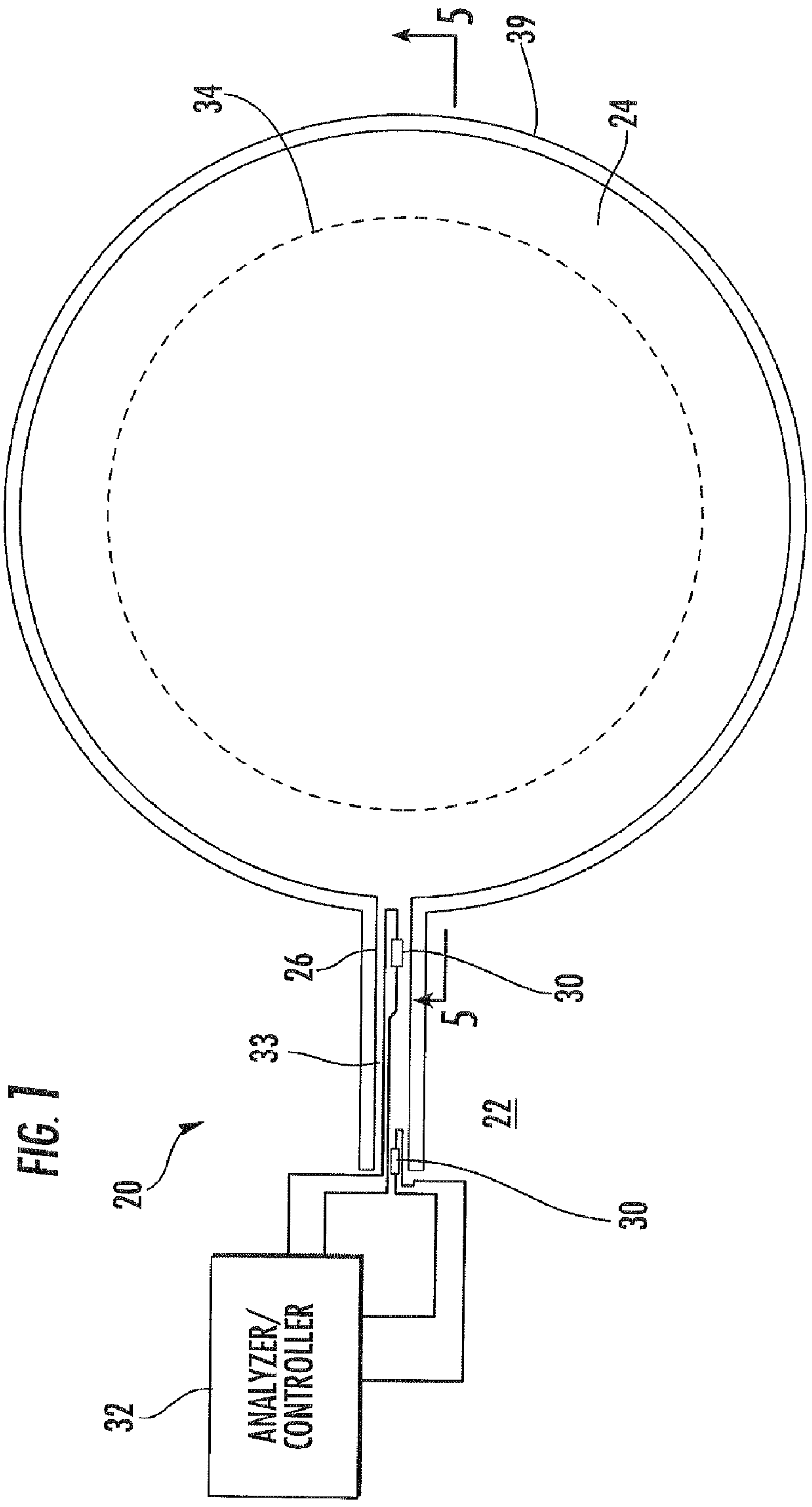
FIG. 1 is a top plan view of a pressure sensor according to an example embodiment.
Figure 6:
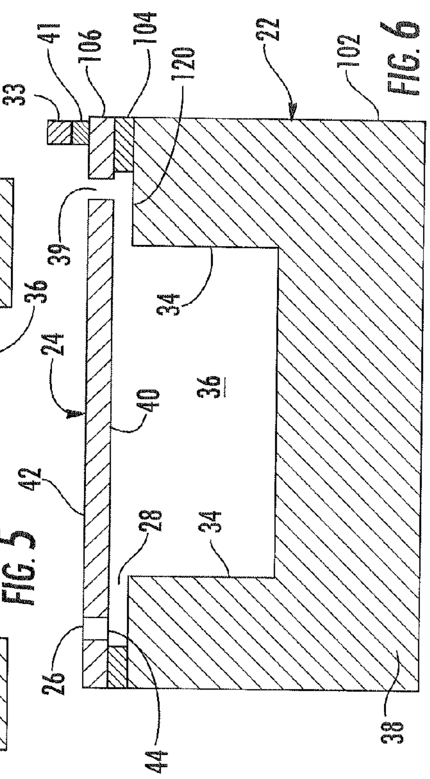
FIG. 6 is a sectional view of another embodiment of the pressure sensor of FIG. 1 according to an example embodiment.

FIGS. 1 and 6 illustrate one example of a pressure sensor 20 according to an example embodiment. Pressure sensor 20 comprises a micro electrical mechanical system (MEMS) transducer configured to sense or detect pressure changes or fluctuations. Pressure sensor 20 may have various applications, including but not limited to, microphones, hearing aids, sensor arrays, aircraft testing, fluid mechanics experiments or other applications where small sensors of pressure changes or fluctuations are desired. As will be described hereafter, pressure sensor 20 provides a less complex MEMS pressure transducer that achieves strong frequency response at a low cost.

Figure 5:
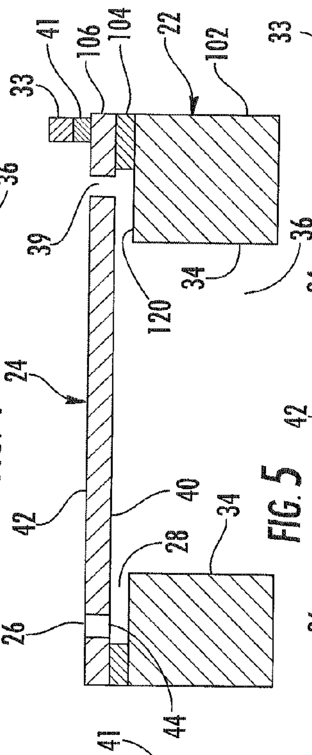
FIG. 5 is a sectional view of the pressure sensor of FIG. 1 taken along line 5-5 according to an example embodiment.

As shown by FIGS. 1 and 5, pressure sensor 20 includes support 22, diaphragm 24, flexure 26, vent 28 (shown in FIG. 5), piezo resistive sensing elements 30 and analyzer/controller 32. Support 22 comprises one or more structures formed from one or more layers of one or more materials configured to support flexure 26 and to ultimately support diaphragm 24. As shown by FIG. 5, support 22 has interior surfaces 34 (shown in broken lines in FIG. 1) which underlie or extend opposite to diaphragm 24 and which form a cavity 36 that extends opposite to diaphragm 24. As shown in FIG. 5, cavity 36 may be open opposite to diaphragm 24. As shown by FIG. 6, cavity 36, in another embodiment, may alternatively be closed by closing portion 38.

Diaphragm 24 comprises a resiliently flexible plate structure supported by flexure 26 over cavity 36. Diaphragm 24 is separated or spaced from support 22 by a space, opening, trench or gap 39. Gap 39 continuously extends about and around diaphragm 24 but for where flexure 26 bridges between support 22 and diaphragm 24. Diaphragm 24 is configured to move, flex or vibrate in response to pressure fluctuations in the air or surrounding environment. As shown by FIG. 6, diaphragm 24 includes a lower face 40 facing towards cavity 36 and an opposite upper face 42 facing away from cavity 36. Although diaphragm 24 is illustrated as being provided by a single homogenous layer, in other embodiments, diaphragm 24 may be provided by multiple layers. According to one embodiment, diaphragm 24 is formed from silicon. In other embodiments, diaphragm 24 may be formed from other materials.

Flexure 26 comprises one or more structures coupled between support 22 and diaphragm 24. For purposes of this disclosure, the term "coupled" shall mean the joining of two members or structures directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. The term "operably coupled" shall mean that two members are directly or indirectly joined such that motion may be transmitted from one member to the other member directly or via intermediate members.

In the particular example illustrated, flexure 26 cantilevers or supports diaphragm 24 above cavity 36 and above vent 28. Flexure 26 is configured to undergo flex or strain and to move in response to or in proportion to movement of diaphragm 24 as a result of pressure fluctuations adjacent to diaphragm 24. In the particular example illustrated, flexure 26 is formed out of the same one or more layers of materials that also form diaphragm 24. In the particular example illustrated, flexure 26 is coplanar with diaphragm 24. In the example illustrated, flexure 26 has a lower surface 44 that is coplanar with face 40 of diaphragm 24. As a result, flexure 26 and diaphragm 24 may be formed in conjunction with one another. In addition, diaphragm 24 may be provided with a lower mass while maintaining a spring constant of flexure 26. As a result, pressure sensor 20 may achieve enhanced frequency response. In other embodiments, pressure sensor 20 may have other configurations and may be formed in other manners.

In general, the frequency response of pressure sensor 20 is substantially equal to the square root of the spring constant of flexure 26 divided by the mass of diaphragm 24. In the particular example illustrated, pressure sensor 20 is able to achieve a frequency response of at least 5 kHz. In the example shown, pressure sensor 20 is also able to achieve a frequency response of at least about 20 kHz and even greater than 100 kHz. Consequently, pressure sensor 20 may be used in industrial and other applications where such enhanced sensitivity and frequency response are beneficial.

Vent 28 comprises a passage extending from cavity 36 to an exterior of pressure sensor 20. Vent 28 permits air pressure within cavity 36 to be discharged while providing sufficient resistance to the discharge of air (or other gas) to provide a low-frequency cut off. In other words, vent 28 further reduces the likelihood of vibrations in pressure sensor 20 itself being sensed or reduces their impact. As shown by FIG. 6, vent 28 extends in a direction non-perpendicular to diaphragm 24. In the particular embodiment illustrated, vent 28 is at least partially bounded by support 22 and face 40 of diaphragm 24. Vent 28 extends adjacent to flexure 26 on opposite side edges of flexure 26 and connects with gap 39. As will be described hereafter, this configuration of vent 28 lessons the complexity of pressure sensor 20 and may be more easily fabricated. In other embodiments, vent 28 may have other configurations and may extend at other locations.

The relatively narrow spacing between face 40 and support 22 provide sufficient resistance to provide the low-frequency cut off. According to one embodiment, vent 28 provides a low-frequency cut off for frequencies of less than or equal to about 0.1 to 10 Hz. According to one embodiment of vent 28 has a hydraulic diameter of less than or equal to about 20 μm. In other embodiments, vent 28 may have a different hydraulic diameter for different low-frequency cutoffs.

Piezo resistive sensing elements 30 comprise elements configured to undergo electrical resistance change in response to strain. Piezo resistive sensing elements 30 are located on and supported by flexure 26 so as to undergo electrical resistance change in response to strain experienced by flexure 26 as diaphragm 24 moves. The change in electrical resistance is sensed to detect or to determine, sense or measure pressure fluctuations which are causing movement of diaphragm 24. As shown by FIG. 1, elements 30 are electrically connected to analyzer/controller 32 by electrical lines, such as electrically conductive traces 33, supported by flexure 26 and support 22. In the embodiment shown, traces 33 are electrically insulated from layer 106 by an intermediate dielectric or passivation layer 41.

In the example illustrated, pressure sensor 20 includes two piezo resistive elements 30 positioned at opposite ends of flexure 26. Because the largest strain forces occur at the opposite ends of flexure 26, elements 30 are also located to sense the largest strains. As a result, the sensitivity or frequency response of pressure sensor 20 is enhanced. In other embodiments, sensor 20 may include a greater or fewer of such elements 30 along flexure 26. According to one embodiment, elements 30 are provided on flexure 26 by doping or implanting p-type or n-type dopants or by bonding or mounting independently formed piezo resistive elements 30 upon flexure 26.

Analyzer/controller 32 comprises one or more electronics configured to sense or detect the change in electrical resistance across elements 30 and to determine or calculate pressure fluctuations, such as frequency and amplitude, based upon the sensed changes in electric resistance. According to one embodiment, analyzer/controller 32 may be embodied as part of a general processing unit configured to perform other functions as well. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, analyzer/controller 32 may be embodied as part of one or more application-specific integrated circuits (ASICs). Unless otherwise specifically noted, analyzer/controller 32 is not limited to any specific combination of hardware circuitry and software, nor to any particular source for the instructions executed by the processing unit.

Figure 2:
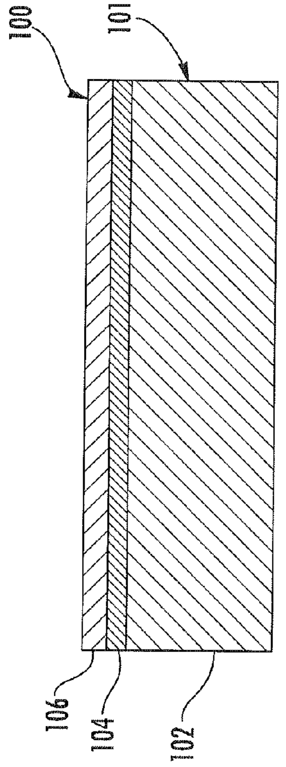

FIGS. 2-5 illustrate one example method 100 for forming pressure sensor 20. In particular, FIGS. 2-5 illustrate one example method by which supports 22, diaphragm 24, flexures 26 and vent 28 are formed. The forming of or provision of sensor elements 30 is not shown. As shown by FIG. 2, a wafer 101 is initially provided. The wafer 101, a portion of which is shown, includes a base or substrate 102 which supports layers 104 and 106. Substrate 102 may comprise any of a variety materials serving as a foundation for layers 104 and 106. In one embodiment, substrate 102 comprises silicon. In other embodiments, substrate 102 may comprise one or more other materials.

Layer 104 comprises one or more layers of one or more materials configured to space layer 106 from substrate 102. At least portions of layer 104 are further configured to be removed to subtly form vent 28. In one embodiment, layer 104 insulates layer 106 from substrate 102. In one embodiment, layer 104 comprises an oxide of the material of substrate 102. For example, in one embodiment where substrate 102 comprises silicon, layer 104 comprises silicon dioxide. In other embodiments, layer 104 may comprise other materials.

Layer 106 comprises one or more layers of one or more materials configured to perform diaphragm 24 as well as one or more flexures 26. Layer 106 is formed from one or more materials which, when provided with an appropriate thickness, resiliently flux in response to pressure fluctuations in the surrounding environment or air. The one or more materials forming layer 106 are further configured to be removed to form gap 39 about diaphragm 24 and adjacent to flexure 26. In one embodiment, layer 106 is formed from the same base material as substrate 102 and layer 104. For example, in one embodiment where substrate 102 comprises silicon and layer 104 comprises silicon dioxide, layer 106 comprises silicon. In such an embodiment, wafer 101 comprises a silicon-on-insulator (SOI) wafer.

In the example illustrated, substrate 102, layer 104 and layer 106 are initially provided with appropriate thicknesses such that their thicknesses are substantially equal to the end thicknesses of such layers in the final pressure sensor 20. In other words, material does not need to be added or removed from such layers to achieve the final end thickness. In the example illustrated, substrate 102 has a thickness of at least about 500 μm and nominally about 725 μm. Layer 104 has a thickness of between about 0.1 μm and about 10 μm and nominally about 4 μm. Layer 106 has a thickness of between about 0.1 μm and 4 μm and nominally about 2 micrometers. In other embodiments, the thickness the substrate 102 and layers 104, 106 may have other values. In other embodiments, the layers of wafer 101 may have initial thicknesses which are different from the final thicknesses of such layers in the finished pressure sensor 20, wherein the initially provided thicknesses may be reduced or increased by subsequent material reduction or addition processes.

Figure 3:
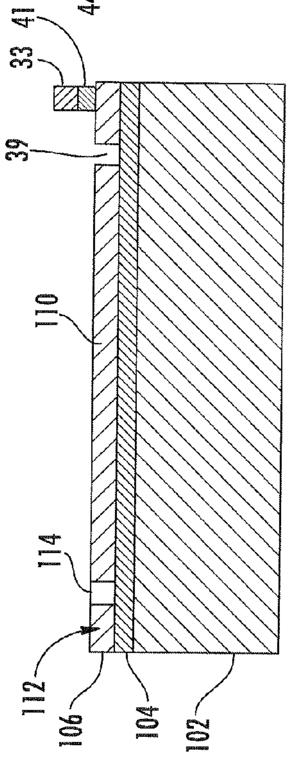

As shown in FIG. 3, portions of layer 106 are removed so as to form gap 39. Gap 39 separates layer 106 into a central diaphragm portion 110, support portion 112 and flexure portion 114, wherein portions 110, 112 and 114 subsequently form at least portions of support 22, diaphragm 24 and flexure 26, respectively. In one embodiment, portions of layer 106 are removed by photolithography or etching. In other embodiments, layer 106 may be removed in other fashions. As further shown by FIG. 3, electrically conductive traces 33 are further formed by depositing, patterning or removing deposited material on a deposited or formed dielectric layer 41. Although not shown, piezo resistive sensing elements 30 (shown in FIG. 1) may also be formed by implanting piezo resistive material in layer 106 at locations corresponding to flexure portion 114 of layer 106. In yet other embodiments, the one or more sensor elements 30 may be formed upon flexure portions 114 or otherwise provided on flexure portions 114 in other manners. Likewise, electrical connection to such elements 30 may be provided in other manners.

Figure 4:
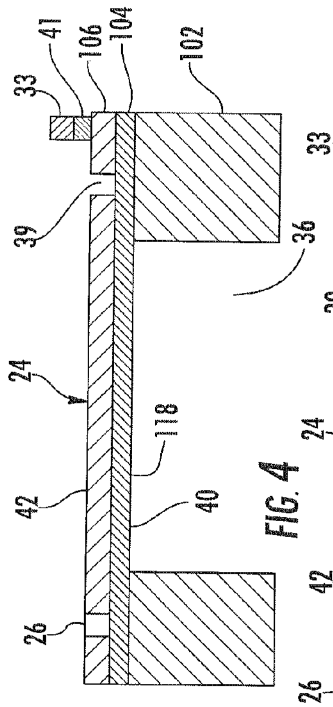

As shown by FIG. 4, portions of substrate 102 are removed to form cavity 36. In particular, portions of substrate 102 opposite diaphragm portion 110 are removed from a side of substrate 102 on an opposite of layer 104 as layer 106. Portions of substrate 102 are removed such that a lower face 118 of layer 104 is exposed adjacent to cavity 36. In one embodiment, cavity 36 is formed by etching into substrate 102. In other embodiments, cavity 36 may be formed in other manners.

As shown by FIG. 5, portions of layer 104 are removed to interconnect cavity 36 to gap 39 so as to form vent 28. In particular, portions of layer 104 sandwiched between diaphragm portion 110 and a top shelf 120 of substrate 102 extending from cavity 36 to gap 39 are removed. As a result, substrate 102, remaining portions of layer 104 and support portion 112 of layer 106 form support 22 while diaphragm portion 110 of layer 106 forms diaphragm 24 and while flexure portion 114 of layer 106 forms flexure 26. According to one embodiment, the removal of the illustrated portion of layer 104 to release diaphragm portion 110 (diaphragm 24) and flexure portion 114 (flexure 26) may be performed by etching. In other embodiments, such portions of layer 104 may removed by other material removal processes. As shown by FIG. 6, and as noted above, cavity 36 may be closed off with the addition of closing portion 38. In other embodiments, cavity 36 may remain open opposite to diaphragm 24.

Overall, the method 100 illustrated and described with respect to FIGS. 2-6 provides a relatively less complex and low-cost manufacturing process for fabricating multiple pressure sensors 20 from a wafer 101. The illustrated method may be performed with relatively few deposition, patterning, masking, photolithography or other fabrication steps. At the same time, the produced pressure sensor 20 provides a relatively large frequency response and enhanced sensitivity. In other embodiments, pressure sensor 20 may be formed using other fabrication processes. Moreover, the order of the steps depicted in FIGS. 2-6 may be changed or altered or additional intermediate steps may be added.

Figure 7:
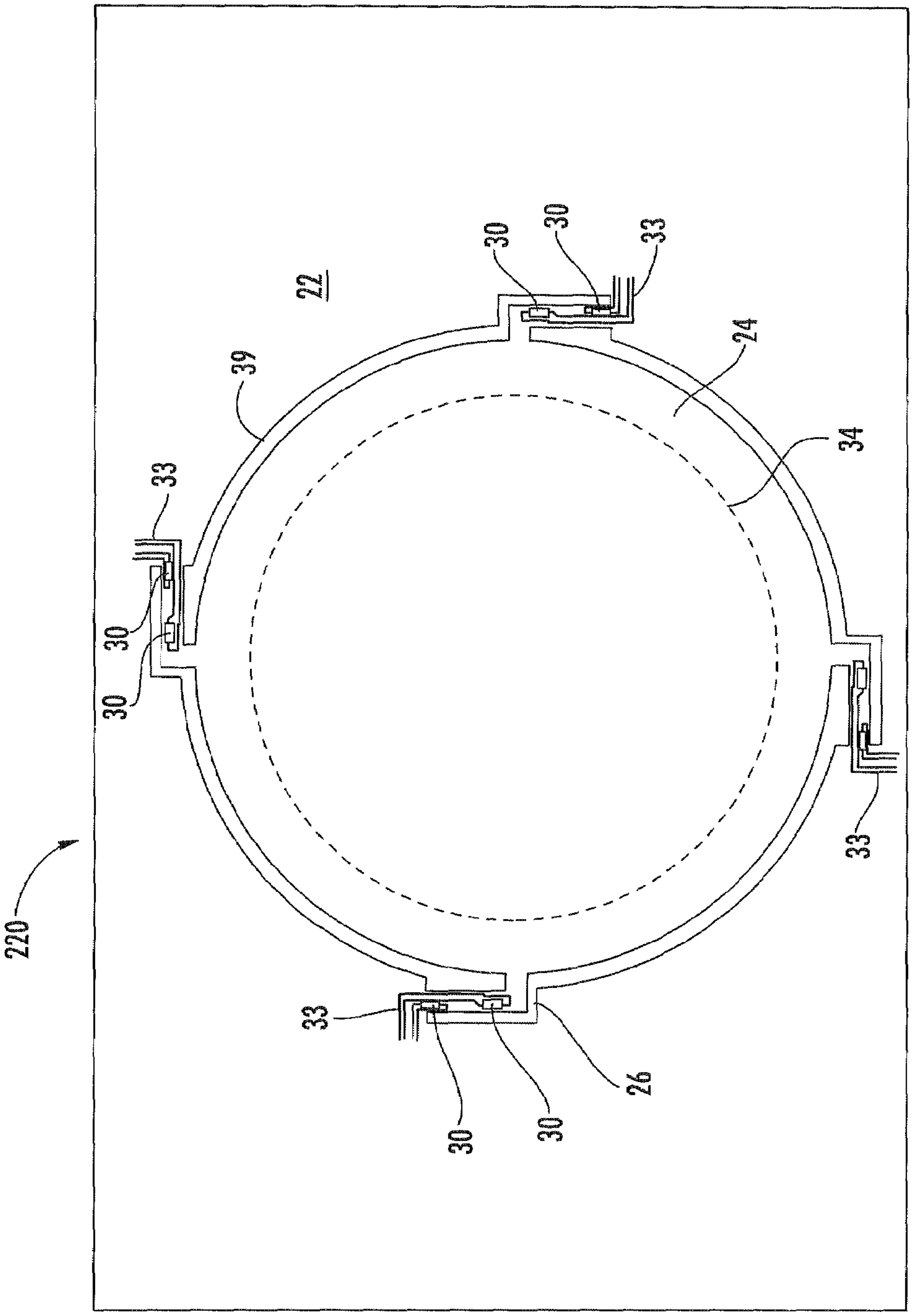
FIG. 7 is a top plan view of another embodiment of the pressure sensor of FIG. 1 according to an example embodiment.

FIG. 7 is a top plan view of pressure sensor 220, another embodiment of pressure sensor 20 shown in FIGS. 1 and 5. Pressure sensor 220 is similar to pressure sensor 20 except that pressure sensor 220 includes a four, rather than one, flexure 26 pivotably supporting diaphragm 24. Those remaining elements of pressure sensor 220 which correspond to elements of pressure sensor 20 are numbered similarly. Like pressure sensor 20, pressure sensor 220 includes piezo resistive sensing elements 30 which are supported by flexures 26. Each of sensing elements 30 is electrically connected to analyzer controller 32 (shown in FIG. 1) via electrically conductive traces 33. Like pressure sensor 20, pressure sensor 220 includes a vent 28 (shown in FIG. 5) which extends from a cavity 36 (formed by side edges 34) of support 22 across a top shelf 120 (shown in FIG. 5) of support 22 between support 22 and diaphragm 24 to gap 39. As a result, like pressure sensor 20, pressure sensor 220 provides enhanced sensitivity to pressure fluctuations and an enlarged frequency response to such fluctuations while being less sensitive to noise and other environmental characteristics such as vibration of pressure sensor 22.

As shown by FIG. 7, flexures 26 are equidistantly spaced about diaphragm 24. Because pressure sensor 220 includes multiple flexures 26 and multiple sensing elements 30 supported by such flexure 26, movement of diaphragm 24 in response to pressure changes is more uniform and has a lesser maximum displacement. As a result, gap 39 and vent 28 may be smaller and more easily fabricated. Although pressure sensor 220 is illustrated as having four flexures 26 angularly spaced 90 degrees apart from one another about diaphragm 24, in other embodiments, pressure sensor 220 may include a greater or fewer number of such flexures 26. For example, pressure sensing 220 may alternatively include two flexures 26 and associated sensing elements 30 on opposite sides of diaphragm 24. In another embodiment, pressure sensor 220 may include three flexures 26 and associated sensing elements 30 spaced 120 degrees apart from one another about diaphragm 24. In still other embodiments, pressure sensor 220 may include greater than four flexures 26 and associated sensing elements 30. In some embodiments, flexures 26 may not necessarily be equidistantly or equiangularly spaced about diaphragm 24.

According to one embodiment, pressure sensor 220 may be formed using substantially the same method illustrated and described above with respect to FIGS. 2-5. In such an embodiment, fewer portions of layer 106 are removed so as to pattern or define the additional three flexures 26 equidistantly spaced about diaphragm 24 and support 22. The method may also be used to form pressure sensor 220 having fewer or greater than four flexures 26. As shown in FIG. 7, the method would also involve forming additional sensing elements 30 and electrically conductive traces or lines 33 on the additional flexures 26. As with the method described for forming sensor 20, the same method for forming pressure sensor 220 is a less complex and a low-cost process for forming pressure sensor 220.

Figure 12:
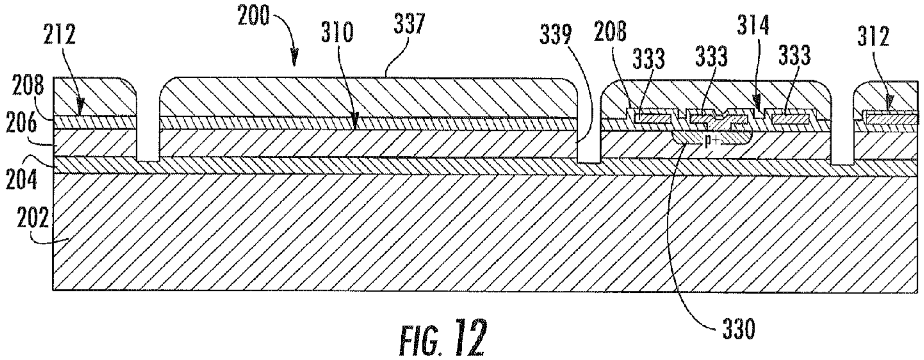
Figure 13:
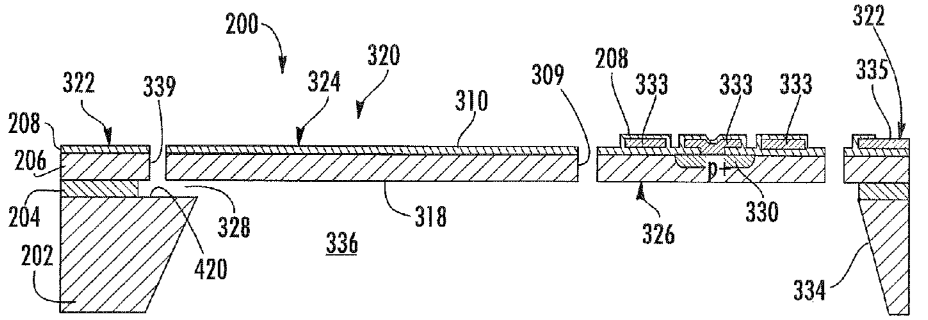
FIG. 13 is a sectional view of another embodiment of the pressure sensor of FIG. 1 according to an example embodiment.

FIG. 13 is a sectional view illustrating pressure sensor 320, another embodiment of pressure sensor 20. FIGS. 9-13 illustrate method 400, one example method for forming pressure sensor 320. FIGS. 9-13 are each sectional views through both the diaphragm and the flexure of the pressure sensor 320 as it is being formed.

As shown by FIG. 13, pressure sensor 320 is similar to pressure sensors 20 and 220 in that pressure sensor 320 includes support 322, diaphragm 324, one or more flexures 326 (one of which is shown), vent 328, piezo resistive sensing elements 330 and analyzer/controller 32 (shown and described with respect to FIG. 1). Support 322, diaphragm 324, and flexures 326 are formed from the same materials and are substantially similar to support 22, diaphragm 24 and flexures 26, respectively, except that each of such structures additionally includes passivation layer 208. Passivation layer 208 electrically insulates diaphragm 324 and flexures 326 from electrically conductive traces 333. Passivation layer 208 further encapsulates traces 333 to insulate traces 333 from other electrical contact and to protect traces 333 from corrosion.

Piezo resistive sensing elements 330 (one of which is shown) specifically comprise p-type piezo resistive elements. Elements 330 are formed by implanting p-type dopants into the material of flexures 326 (one of which is shown). Because elements 330 are p-type piezo resistive sensing elements, elements 330 provide sensor 220 with enhanced sensitivity and performance. In other embodiments, elements 330 may comprise n-type implanted piezo resistive elements or may comprise piezo resistive elements that are bonded, adhered, fastened or otherwise mounted upon flexures 326.

Figure 8:
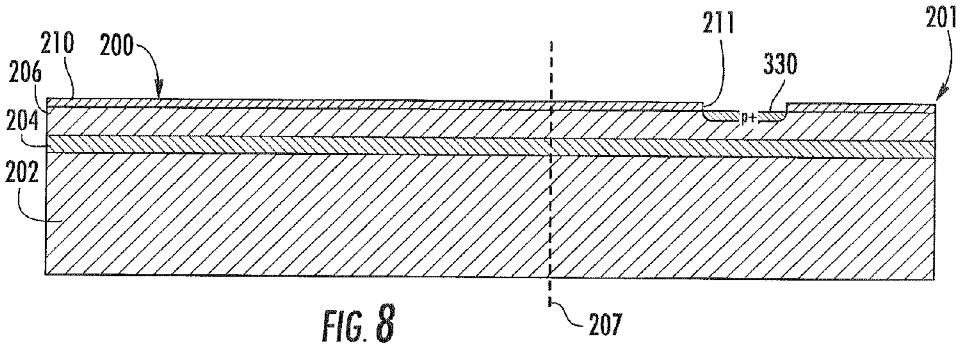

As shown by FIG. 8, to form sensor 220, a wafer 201 is initially formed or provided. Wafer 201, a portion of which is shown, includes a base or substrate 202 which supports layers 204 and 206. Substrate 202 may comprise any of a variety materials serving as a foundation for layers 204 and 206. In one embodiment, substrate 202 comprises silicon. In other embodiments, substrate 202 may comprise one or more other materials.

Layer 204 comprises one or more layers of one or more materials configured to space layer 206 from layer 202. At least portions of layer 204 are further configured to be removed to subsequently form vent 328. In one embodiment, layer 204 insulates layer 206 from layer 202. In one embodiment, layer 204 comprises an oxide of the material of substrate 202. For example, in one embodiment where layer 202 comprises silicon, layer 204 comprises silicon dioxide. In other embodiments, layer 204 may comprise other materials.

Layer 206 comprises one or more layers of one or more materials configured to form diaphragm 324 as well as one or more flexures 326. Layer 206 is formed from one or more materials which, when provided with an appropriate thickness, resiliently flex in response to pressure fluctuations in the surrounding environment or air. The one or more materials forming layer 206 are further configured to be removed to form a trench or gap 339 about diaphragm 324 and adjacent to flexure 326. In one embodiment, layer 206 is formed from the same base material as substrate 202 and layer 204. For example, in one embodiment where substrate 202 comprises silicon and layer 204 comprises silicon dioxide, layer 206 comprises silicon. In such an embodiment, wafer 201 comprises a silicon-on-insulator (SOI) wafer.

In the example illustrated, substrate 202, layer 204 and layer 206 are initially provided with appropriate thicknesses such that their thicknesses are substantially equal to the end thicknesses of such layers in the final pressure sensor 220. In other words, material does not need to be added or removed from such layers to achieve the final and thickness. In the example illustrated, substrate 202 has a thickness of at least about 500 μm and nominally about 725 μm. Layer 204 has a thickness of between about 0.1 μm and about 10 μm and nominally about 4 μm. Layer 206 has a thickness of a between about 0.1 μm and 4 μm and nominally about 2 micrometers. In other embodiments, the thickness the substrate 202 and layers 204, 206 may have other values. In other embodiments, the layers of wafer 201 may have initial thicknesses which are different from the final thicknesses of such layers in the finished pressure sensor 220, wherein the initially provided thicknesses may be reduced or increased by subsequent material reduction or addition processes. For example, in particular embodiments, layer 202 may have a larger thickness, wherein layer 202 and subsequently been to as little as 200 μm to change the volume of cavity 334.

As further shown by FIG. 8, a photolithography mask 210 is patterned upon layer of 206 and selected portions of layer 206 through openings 211 in the mask are implanted with p-type dopants to form piezo resistive and sensing elements 330 in layer 206. Although only one piezo resistive sensing element 330 is shown, in other embodiments, multiple piezo resistive sensing elements 330 may be formed in layer 206. For example, piezo resistive sensing elements 330 may be formed at opposite ends of flexure 326 as shown in either FIG. 1 or FIG. 7. In yet other embodiments, such portions of layer 206 may alternatively be implanted with n-type dopants to form piezo resistive sensing elements 330. In yet other embodiments, the use of mask 210 and such dopants or implants may be omitted where piezo resistive sensing on the 330 are presently or subsequently mounted to those portions of wafer 201 which form the one or more flexures 326.

Figure 9:
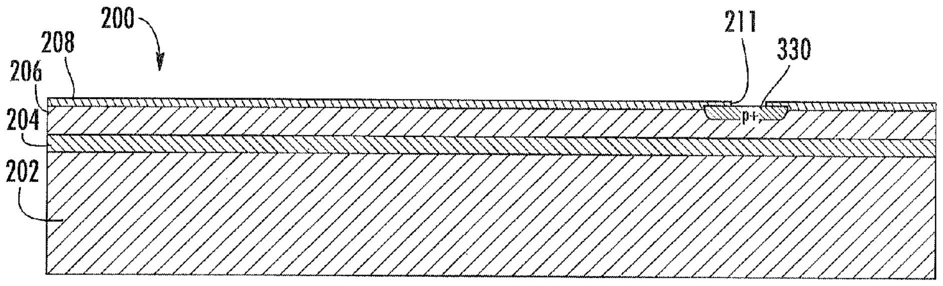

As shown in FIG. 9, photolithography mask 210 is removed after the formation of elements 330. Passivation layer 208 is formed on layer 206 and partially over elements 330, forming via 211 for each element 330. In one embodiment, layer 208 may be formed by selectively oxidizing or passivating a surface of layer 206. In yet another embodiment, layer 208 may be formed by depositing an oxidized material or other electrically insulating material layer on layer 206. In particular embodiments, mask 210 may be left where the one or more materials of layers 210 are also configured to serve as a passivation or dielectric layer.

Figure 10:
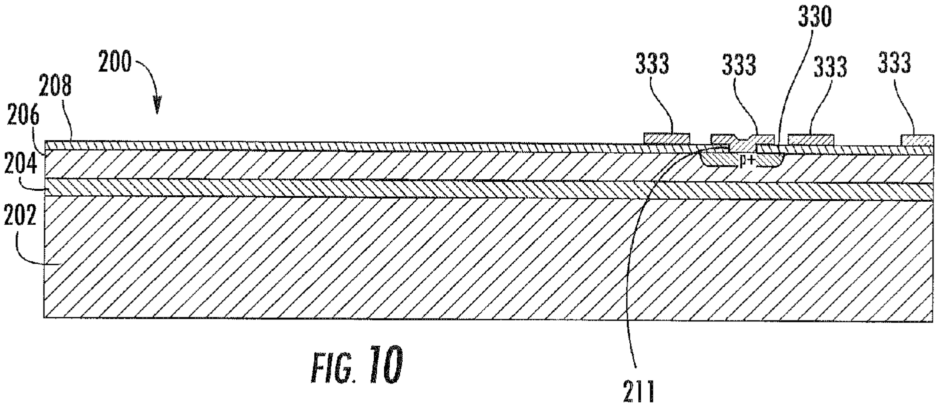

As shown by FIG. 10, electrically conductive material is deposited and patterned on layer 208 to form electrically conductive traces 333. Electrically conductive traces 333 extend through associated vias 211 (one of which is shown) into electrical contact with elements 330 (one of which is shown) and are further placed in electrical connection with analyzer/controller 32 (shown and described above with respect to FIG. 1).

Figure 11:
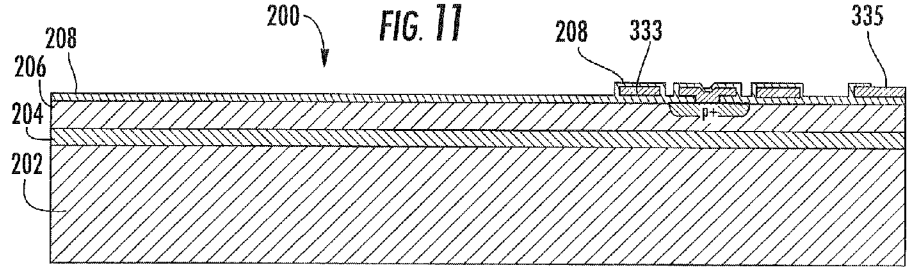

As shown by FIG. 11, additional dielectric material is deposited or added onto layer 208 two increased the thickness of layer 208 and such that layer 208 encapsulates traces 333. The additional dielectric material further electrically insulates traces 333 and protects traces 333 from corrosion. As shown by FIG. 11, portions of the dielectric material are patterned or are subsequently removed, such as by etching, to expose portions 335 of traces 333 for electrical connection to analyzer/controller 32 (shown in FIG. 1).

As shown in FIG. 12, a photolithography layer or mask 337 is deposited or formed on layer 208. Using the mask 337, portions of layer 206 are removed so as to form a trench or gap 339. Gap 339 separates layer 206 into a central diaphragm portion 310, support portion 312 and flexure portion 314 which subsequently forms at least portions of support 322, diaphragm 324 and flexure 326. Although the portions of layer 206 are described as being removed via photolithography and etching, in other embodiments, layer 206 may be removed in other fashions.

As shown by FIG. 13, mask 337 is removed. In addition, portions of substrate 202 are removed to form cavity 336. In particular, portions of substrate 202 opposite diaphragm portion 110 are removed from a side of substrate 202 on an opposite of layer 204 as layer 206. Portions of substrate 202 are removed such that a lower face 318 of layer 204 is exposed adjacent to cavity 336. In one embodiment, cavity 336 is formed by photolithography and etching into substrate 202. In other embodiments, cavity 336 may be formed in other manners.

As shown by FIG. 13, portions of layer 204 are removed to interconnect cavity 336 to gap 339 so as to form vent 328. In particular, portions of layer 204 sandwiched between diaphragm portion 310 and a top shelf 420 of substrate 202 extending from cavity 336 to gap 339 are removed. As a result, substrate 202, remaining portions of layer 204 and support portion 312 of layer 206 form support 322 while diaphragm portion 310 of layer 206 forms diaphragm 324 and while flexure portion 314 of layer 206 forms flexure 326. According to one embodiment, the removal of the illustrated portion of layer 204 to release diaphragm portion 310 (diaphragm 324) and flexure portion 314 (flexure 326) may be performed by etching. In other embodiments, such portions of layer 204 may removed by other material removal processes. As shown by FIG. 6, cavity 336 may be closed off with the addition of closing portion 38. In other embodiments, cavity 336 may remain open opposite to diaphragm 324.

Like method 100, method 200 provides a relatively less complex and low-cost manufacturing process for fabricating multiple pressure sensors 220 from a wafer 201. The illustrated method may be performed with relatively fewer deposition, patterning, masking, photolithography or other fabrication steps. At the same time, the produced pressure sensor 220 provides a relatively large frequency response and enhanced sensitivity. In other embodiments, pressure sensor 220 may be formed using other fabrication processes. Moreover, the order of the steps depicted in FIGS. 8-13 may be changed or altered or additional intermediate steps may be added.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A pressure sensor comprising:
a support for forming a cavity;
a diaphragm over the cavity
one or more flexures extending between the support and the diaphragm while bridging across a gap coplanar with the diaphragm between the support and the diaphragm, wherein each of the one or more flexures is narrower than the diaphragm; and
a piezo resistive sensing element on at least one of the one or more flexures.

2. The pressure sensor of claim 1, wherein the pressure sensor has a frequency response of at least about 5 kHz.

3. The pressure sensor of claim 1, wherein the pressure sensor has a frequency response of at least about 20 kHz.

4. The pressure sensor of claim 1, wherein the diaphragm has a first surface adjacent to the cavity and wherein the one or more flexures has a second surface substantially coplanar with the first surface.

5. The pressure sensor of claim 1, further comprising a vent in communication with the cavity, at least a portion of the vent being non-perpendicular to the diaphragm.

6. The pressure sensor of claim 5, wherein the vent is at least partially bounded by the support and a face of the diaphragm.

7. The pressure sensor of claim 5, wherein the vent extends adjacent to the one or more flexures.

8. The pressure sensor of claim. 5, wherein the vent has a hydraulic diameter of less than or equal to about 20 μm.

9. The pressure sensor of claim 1, wherein the one or more flexures comprise a plurality of flexures spaced about the diaphragm.

10. A pressure sensor comprising:
a support forming a cavity having a floor in a first plane and a shelf in a second plane spaced from the first plane of the floor;
a diaphragm over the cavity opposite the floor and the shelf;
a vent at least partially bounded by and sandwiched between the shelf of the support and a face of the diaphragm; and
a piezo resistive sensing element configured to sense movement of the diaphragm.

11. The pressure sensor of claim 10, further comprising at least one flexure coupled to the diaphragm, wherein the piezo resistive sensing element is supported by the at least one flexure.

12. A method comprising:
forming a diaphragm and one or more coplanar flexures supporting the diaphragm, wherein forming the diaphragm and the one or more flexures comprises:
providing a wafer including a substrate, a first layer on the substrate and a second layer on the first layer;
removing portions of the second layer to form a central diaphragm portion and one or more outwardly extending flexure portions from the second layer;
removing portions of the substrate opposite the diaphragm portion; and
removing portions of the first layer of the diaphragm portion and opposite the one or more flexure portions; and
providing a piezo resistive sensing element on at least one of the one or more flexures.

13. The method of claim 12, wherein the flexures have a spring constant and wherein the diaphragm has a mass such that the sensing element on the at least one of the one or more flexures has a frequency response of at least about 5 kHz.

14. The method of claim 12, wherein the diaphragm has a first surface adjacent to the cavity and wherein the one or more flexures has a second surface substantially coplanar with the first surface.

15. The method of claim 12, further comprising forming a vent in communication with the cavity, at least a portion of the vent being non-perpendicular to the diaphragm.

16. The method of claim 12, further comprising forming a vent, in communication with the cavity, wherein the vent is at least partially bounded by the support and a face of the diaphragm

17. The method of claim 12, further comprising form a vent, in communication with the cavity, wherein the vent extends adjacent the one or more flexures.

18. The method of claim 12, wherein the removing of portions of the substrate is such that portions of the substrate opposite outer portions of the diaphragm portion remain.

19. The method of claim 12,wherein the substrate is silicon, wherein the first layer is silicon dioxide and wherein the second layer is silicon.

20. The method of claim 12,wherein the removing portions of the substrate opposite the diaphragm portion forms an open cavity and wherein the method further comprises closing the cavity opposite the diaphragm portion.

21. A pressure sensor comprising:
a support for forming a cavity;
a diaphragm over the cavity
one or more flexures extending between the support and the diaphragm; and
a piezo resistive sensing element on at least one of the one or more flexures, wherein the pressure sensor has a frequency response of at least about 5 kHz.

22. A pressure sensor comprising:
a support for forming a cavity;
a diaphragm over the cavity
one or more flexures extending between the support and the diaphragm;
a piezo resistive sensing element on at least one of the one or more flexures; and
a vent in communication with the cavity, at least a portion of the vent being non-perpendicular to the diaphragm, wherein the vent has a hydraulic diameter of less than or equal to about 20 μm.

* * * * *

UNITED STATES PATENT AND TRADEMARK OFFICE

CERTIFICATE OF CORRECTION

PATENT NO. : 7,571,650 B2
APPLICATION NO. : 11/830658
DATED : August 11, 2009
INVENTOR(S) : McKinnell et al.

It is certified that error appears in the above-identified patent and that said Letters Patent is hereby corrected as shown below:

In column 9, line 46, in Claim 8, delete "claim. 5," and insert -- claim 5, --, therefor.

In column 10, line 28, in Claim 36, delete "vent," and insert -- vent --, therefor.

In column 10, line 29-30, in Claim 16, after "diaphragm" insert -- . --.

In column 10, line 31, in Claim 17, delete "form" and insert -- forming --, therefor.

In column 10, line 32, in Claim 17, delete "vent," and insert -- vent --, therefor.

In column 10, line 37, in Claim 19, delete "claim 12,wherein" and insert -- claim 12, wherein --, therefor.

In column 10, line 40, in Claim 20, delete "claim 12,wherein" and insert -- claim 12, wherein --, therefor.

Signed and Sealed this

Ninth Day of February, 2010

David J. Kappos

David J. Kappos
*Director of the United States Patent and Trademark Office*